United States Patent [19]

Brzozowski

[11] 3,909,096

[45] Sept. 30, 1975

[54] LAMP SOCKET FOR USE WITH PRINTED CIRCUITS AND THE LIKE

[75] Inventor: Stephen Joseph Brzozowski, Detroit, Mich.

[73] Assignee: International Telephone and Telegraph Corporation, New York, N.Y.

[22] Filed: Feb. 28, 1974

[21] Appl. No.: 446,932

[52] U.S. Cl. .......... 339/17 D; 339/94 L; 339/127 R; 339/262 R

[51] Int. Cl.$^2$ .......... H05K 1/07

[58] Field of Search... 339/17 D, 94 L, 94 A, 126 R, 339/126 RS, 127 R, 127 C, 128, 262 R, 262 F, 262 P, 262 RR

[56] References Cited

UNITED STATES PATENTS

| | | | |
|---|---|---|---|
| 3,001,165 | 9/1961 | Woofter et al. | 339/17 D |
| 3,047,829 | 7/1962 | Mouat | 339/127 R |
| 3,050,705 | 8/1962 | Benson | 339/17 D |
| 3,146,052 | 8/1964 | Burch et al. | 339/126 RS X |
| 3,206,708 | 9/1965 | Fitzgerald | 339/127 R X |
| 3,324,442 | 6/1967 | Greasley | 339/17 D |
| 3,555,341 | 1/1971 | Curtis | 339/127 C UX |
| 3,649,955 | 3/1972 | Schmidt et al. | 339/94 A X |

*Primary Examiner*—Joseph H. McGlynn
*Assistant Examiner*—Howard N. Goldberg
*Attorney, Agent, or Firm*—J. B. Raden; D. P. Warner

[57] ABSTRACT

Lamp sockets are provided which may be inserted through an opening from a first side of a thin wall and twisted to lock in position against the other side of the wall. Locking is affected between orienting, or aligning, shoulders integral to the socket and openings in the thin wall. The sockets include electrical contact elements which complete connections with conductors formed by flexible circuits, printed circuits or the like, positioned along the face of the first side of the thin wall, thereby enabling electric circuits to be completed between the sockets and the conductors.

11 Claims, 7 Drawing Figures

LAMP SOCKET FOR USE WITH PRINTED CIRCUITS AND THE LIKE

BACKGROUND OF THE INVENTION

1. Field of the Invention

The present invention relates to lamp sockets of a kind which may be fitted through an opening and turned in a bayonet fashion to lock in a position completing an electrical connection. It relates more particularly to bayonet locking lamp sockets which incorporate connector elements enabling the lamp sockets to be connected electrically to conductor elements arranged as parts of printed circuits or as conductive elements aligned along a surface.

2. Description of the Prior Art

Prior art sockets have been provided to mate with an opening in a car body or the like and to enable quick insertion and removal. Examples of such sockets are shown in U.S. Pat. Nos. 3,668,603 and 3,718,892. The prior art devices have been designed to function as the electric terminals of conventional wiring harnesses consisting of bundles of individual insulated wires. As such, these sockets have required receptacles for receiving and locking with individual terminal plugs at the ends of the individual wires in the harnesses. None of the known prior art devices are adaptable to use with a ribbon-like harness in which the individual conductors are embedded in a plastic insulator body instead of being formed from individual insulated wires. The prior art devices therefore are not suitable for use with wiring harnesses of the most recent types to be adapted to automotive use.

SUMMARY OF THE INVENTION

In view of the foregoing, it is an object of the present invention to provide improved lamp sockets which may be mounted readily in automotive vehicles to complete connections to electric harnesses of a ribbon type or to printed circuit boards.

Sockets according to the invention have shells formed of plastic insulating material which is formed with bayonet mounting elements, or shoulders, adapted to latch securely in place after they have been inserted through prepared openings in thin mounting surfaces. The sockets include spring contact elements which wipingly engage contact areas associated with ribbon-like wiring harnesses or printed circuit boards to complete electrical circuits.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF PREFERRED EMBODIMENTS

Figure 1:
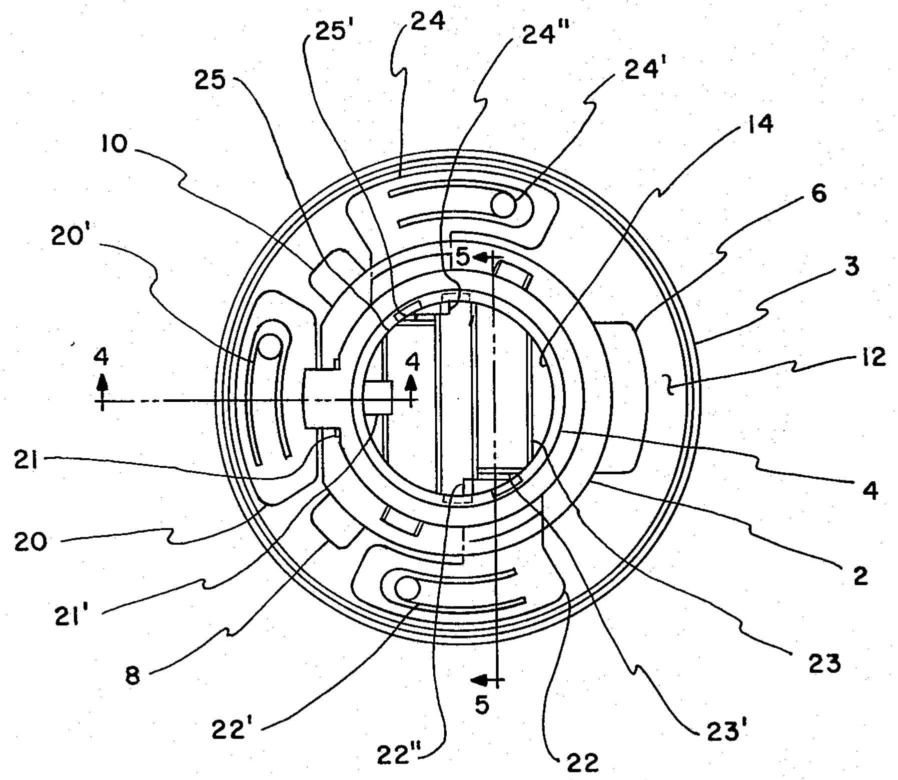
FIG. 1 is a plan view of a socket according to the invention.

Turning now to FIG. 1, there is disclosed a plan view of an exemplary socket, showing particularly the arrangement of the electrical contact elements relative to the other socket elements. The body 2 of the socket is molded of plastic which is shaped to receive an insert 4 of plastic serving as a retainer for various contact elements and forming the inner face of a bulb receptacle 14. The bulb receptacle 14 is adapted to receive and hold light bulbs. The body 2 includes three orienting or alignment shoulders 6, 8, 10 which are integral to the body 2. The alignment shoulders serve as mating surfaces when the socket is inserted through a specially shaped opening in a thin wall and serve to lock the socket to the wall when twisted into position after insertion. A gasket, or pad, of flexible plastic material is indicated at 12 to provide a seal between the flange 3, integral to the socket body 2, and a wall supporting a printed circuit body or the like.

The spring contact element at 20, with the tongue 20′ formed of electrically conductive spring material, completes an electrical connection via contact element 21, which terminates at the ground terminal 21′ in the receptacle 14. A spring contact element at 22, 22′, 22″ completes an electrical connection to a contact element 23, 23′ in the receptacle 14. Similarly, a spring contact element at 24, 24′, 24″ completes an electrical connection to a contact element 25, 25′ in the receptacle 14. The contact elements 23 and 25 are adapted to establish electrical connections through base contacts of a standard bulb inserted in the socket to the ground terminal 21′.

Figure 2:
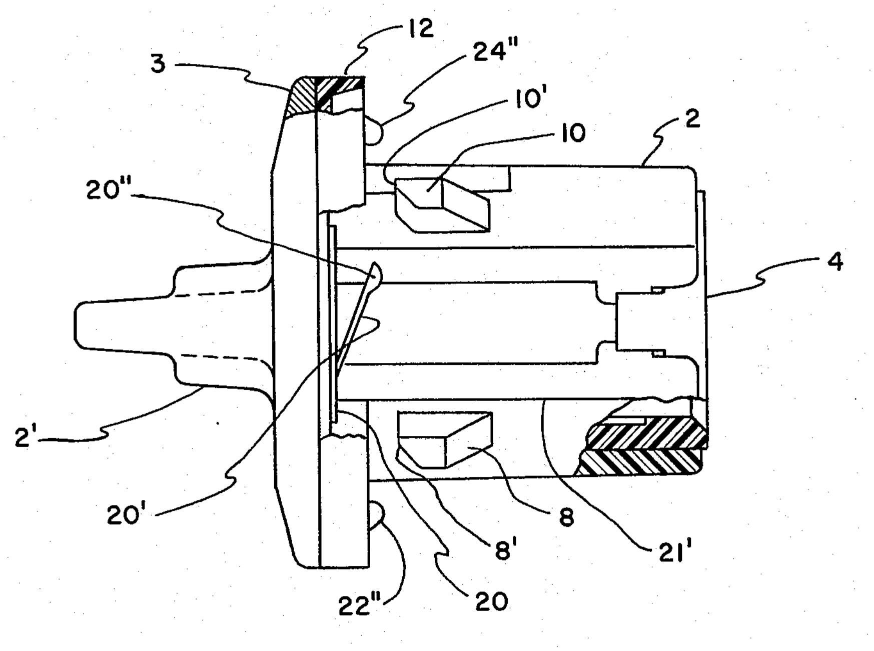
FIG. 2 is a view in partial section from the left side of the view of FIG. 1.
Figures 6, 7:
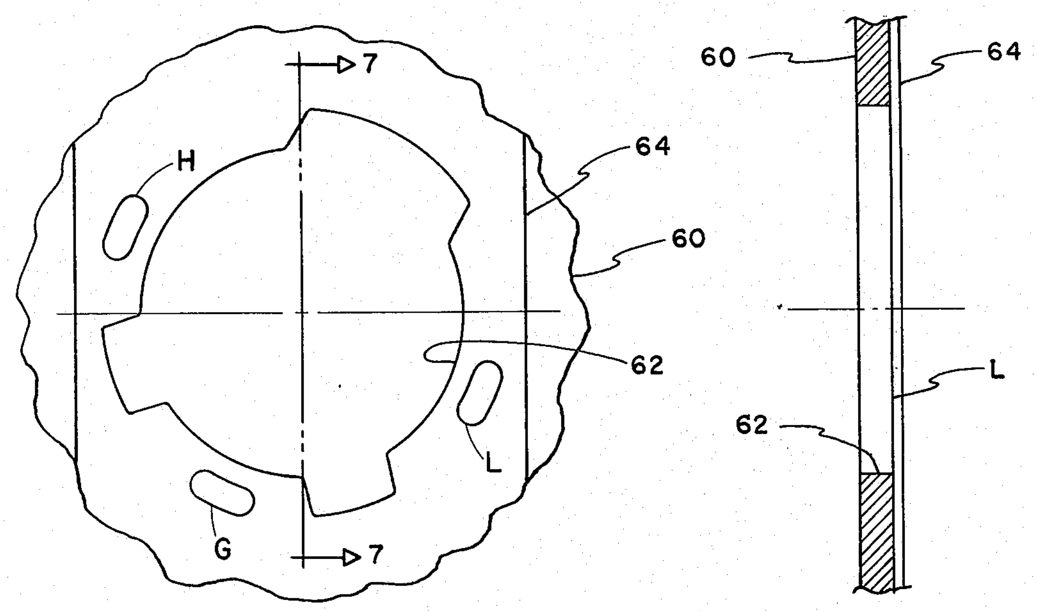
FIG. 6 shows an opening of a form suitable to receive a socket according to the invention.
FIG. 7 illustrates a sectional view through a wall, along the lines 7 — 7 in FIG. 6, showing an opening suitable to receive a socket according to the invention.

FIG. 2 is a side view in partial section of an embodiment of the invention as seen from the left side of FIG. 1. In this view, the flange 3, which is integral to the socket, and a lower extension 2′ of the body 2 are shown. The extension 2′ is shaped to include a receptacle for a hidden portion of the contact element 20 and also serves together with an element 2″ (see FIG. 3) as a convenient handle for insertion and removal of the socket. The detent extensions 8′ and 10′ are formed integral to the body 2 to function as retainers which engage slots in the housing panel and lockably retain the lamp socket structure on the housing after the shoulders 8 and 10 have passed through an opening in a wall, such as is shown in FIGS. 6 and 7. Electrical contacts in the form of extensions 20″, 22″ and 24″ make contact with flat conductor surfaces, on a printed circuit board or the like, when the socket is positioned through a suitable opening in a thin wall and turned to the locking position.

Figure 3:
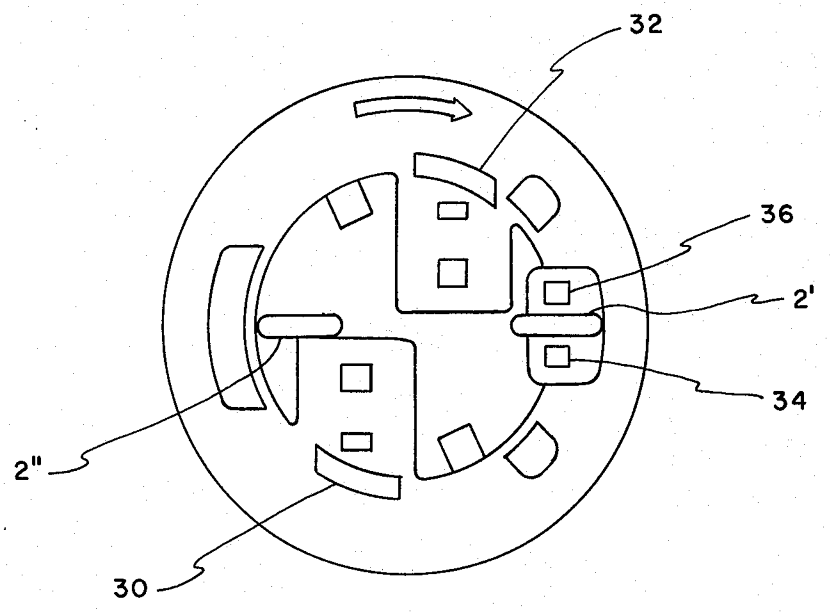
FIG. 3 is a back view of a socket according to the invention.

FIG. 3 is a back view of a socket according to the invention. In this view, further relationships of extensions 2′ and 2″ to the main body of the socket 2 are shown. Recesses at 30 and 31 provide receptacles for extensions of spring contacts 22 and 24, respectively. Recesses 34 and 36 provide access to the inner recess for spring contact 20. These and other recesses shown, but not numbered, are provided also to enable normal molding processes to be followed in the manufacture of the socket bodies.

Figure 4:
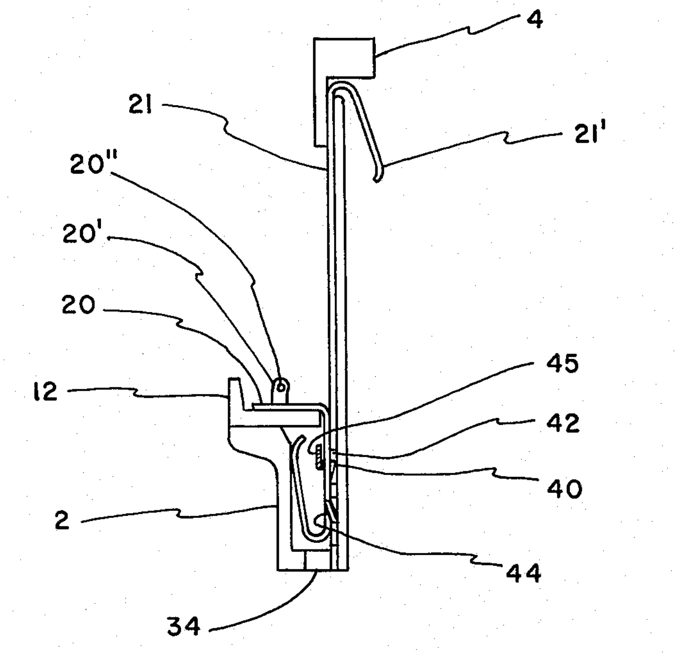
FIG. 4 is a sectional view of a portion of a socket taken along the lines 4 — 4 in FIG. 1.

FIG. 4 is a sectional view of a portion of the socket of FIG. 1, taken along the line 4 — 4. Further relationships are illustrated between the body 2 of the socket, contact elements 20, 20′ and the groundstrap 21, 21′. The groundstrap 21 and the contact element, or groundstrap extension, 20 are locked together by the extension 40 (of the contact element 20) which engages the edge 42 of an opening in the groundstrap 21. The extension 44 of the groundstrap 21 also engages an edge of the socket body 2, indicated by the sectioned portion of the socket body 2 at 45. The opening at 34 provides access to the groundstrap 21, the groundstrap extension 20 and the interlock between them. A contact tip at 20″, which may be of conical form with a rounded apex, or of hemispherical shape, is provided as part of a stamping operation, or otherwise, to complete electrical connections with external conductor elements.

Figure 5:
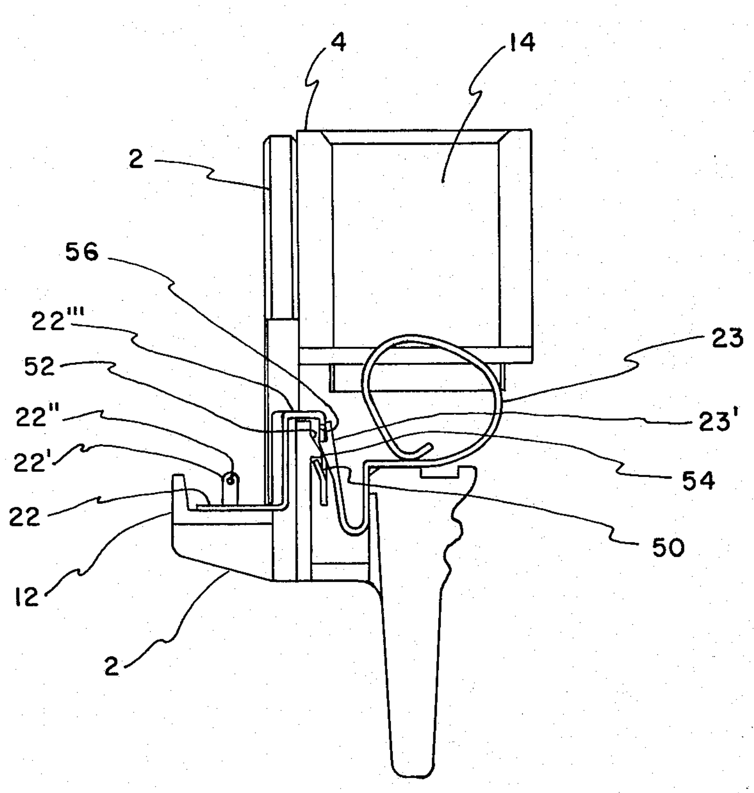
FIG. 5 is a sectional view of a portion of the exemplary socket along the lines 5 — 5 in FIG. 1.

FIG. 5 is a sectional view through a socket as indicated in the lines 5 — 5 of FIG. 1. This view shows relationships between a socket body 2, a bulb insert 4, various electrical contact elements and various mechanical supports for the same.

The contact spring 22, 22″ includes an extension 50 which fits against an extension 52 of the socket body 2 to lock the two parts together. The contact element 23, 23′ includes an extension 54 which engages the edge 56 of the opening in the contact element 22, 22′, locking them together and locking the contact elements 22, and 23 into position in the receptacle 14. The tip 22″ is shaped like tip 20″ to provide contact with external conductor elements.

The contact spring 24, 24′, 24″ and the contact element 25, 25′ are arranged and locked together in the same manner as elements 22, 22′, 22″, 23 and 24 and, therefore, have not been separately illustrated.

FIG. 6 illustrates an opening at 62 in a printed circuit board 60, or the like. This view shows the opening 62 as it would appear from the side into which the socket is inserted. The areas labeled H, G and L represent exposed high beam, ground and low beam contact points of conductors embedded in an insulated layer 64 affixed to the back of board 60. The spring extensions 24′, 20′ and 22′, respectively, will lodge against these areas when the socket is installed through the opening 62.

FIG. 7 is a sectional view through a thin-walled body, along the line 7 — 7 in FIG. 6, suitable for support of a socket in accordance with the present invention. In this view, an opening is indicated at 62, in the body 60. This opening 62, as previously stated, is made suitable to receive and support a socket according to the invention. The body 60 may be of unitary construction with contact elements G, H, L embedded in its face. In a preferred embodiment, however, the body 60 will consist of thin portions of the body of an automotive vehicle, or the like, upon which is fastened a thin plastic layer 64. The plastic layer 64 is generally ribbon-like and supports and insulates ribbon or wire conductors while providing bare contacts at points such as L.

While the principles of the invention have been described above in connection with specific apparatus and applications, it is to be understood that this description is made only by way of example and not as a limitation on the scope of the invention.

I claim:

1. An electric lamp socket for completing electrical connections to conductors supported on a thin wall, such as the wall of a lamp housing, comprising a socket body formed of insulating material, an insert formed of insulating material and shaped to fit into said socket body and latch therewith, means in said socket body supporting a first group of discrete electric contact elements for completing electric connections to the base of an electric bulb, when inserted in said socket, means in said socket body supporting a second group of discrete electric contact elements in electrical contact with respective elements of said first group of electric contact elements, said second group of discrete electric contact elements including spring elements arranged along an outer face of said socket body and adapted to contact external conductor elements, and means formed in said insert to engage said first and second groups of electric contact terminals to lock them in conductive engagement in the socket.

2. The invention as claimed in claim 1, including latching means associated with said socket body to enable said socket body to be locked to a wall after a portion of said socket body has passed through a hole in said wall.

3. The invention as claimed in claim 2, in which said latching means includes a plurality of alignment shoulders integral to said socket.

4. The invention as claimed in claim 3, in which said latching means includes a flange integral to said socket against a face of which the entrance side of a wall impinges when the socket body is locked to the wall.

5. The invention as claimed in claim 1, in which the spring elements include tongue shaped portions supporting contact tips suitable to engage external conductor elements.

6. The invention as claimed in claim 5, in which the tongue shaped portions are aligned along arcs of a circle drawn around the central axis of the socket, said alignment providing for wiping motion of said contact tips against external conductor elements in a direction tangent to said circle when the socket is rotated.

7. The invention as claimed in claim 5, in which the contact tips are shaped like frustrums of cones having their large bases integral to the spring elements and having their small bases rounded to engage external conductor elements.

8. The invention as claimed in claim 5, in which the contact tips are substantially hemispherical in shape.

9. The invention as claimed in claim 1, in which the first group of contact elements include openings therethrough, and the second group of contact elements include extensions to mate with said openings and lock the contact elements together in said socket.

10. The invention as claimed in claim 1, including a pad fitting between said second group of contact elements and a portion of said socket to support said second group of contact elements and to provide a seal between said socket and a wall.

11. The invention as claimed in claim 1, in which a flange is provided integral to the socket body to serve as a stop when the socket body is inserted through an opening in a thin-walled housing, said flange including said outer face with spring elements arranged thereon to contact external conductor elements positioned on the thin-walled housing.

* * * * *